(12) United States Patent
Kaneda

(10) Patent No.: US 7,220,107 B2
(45) Date of Patent: May 22, 2007

(54) THREE BLADE TYPE VERTICAL WINDMILL DEVICE

(75) Inventor: Fumiro Kaneda, Machida (JP)

(73) Assignee: Fumio Kaneda, Tokyo (JP)

( * ) Notice: Subject to any disclaimer, the term of this patent is extended or adjusted under 35 U.S.C. 154(b) by 28 days.

(21) Appl. No.: 10/490,112

(22) PCT Filed: Sep. 25, 2002

(86) PCT No.: PCT/JP02/09853

§ 371 (c)(1),
(2), (4) Date: Aug. 13, 2004

(87) PCT Pub. No.: WO03/027497

PCT Pub. Date: Apr. 3, 2003

(65) Prior Publication Data

US 2004/0265116 A1    Dec. 30, 2004

(30) Foreign Application Priority Data

Sep. 25, 2001 (JP) .............................. 2001-292315
Sep. 25, 2001 (JP) .............................. 2001-292316
Oct. 9, 2001 (JP) .............................. 2001-311335

(51) Int. Cl.
*F03D 7/00*        (2006.01)

(52) U.S. Cl. .................... 416/186 A; 415/4.2; 415/907; 415/129; 415/186; 416/41; 416/42; 416/DIG. 2

(58) Field of Classification Search ................. 415/4.2, 415/4.4, 907, 129, 186; 416/41, 42, 119, 416/185, 186 R, 186 A, 197 A, DIG. 2
See application file for complete search history.

(56) References Cited

U.S. PATENT DOCUMENTS 1,766,765 A * 6/1930 Savonius ................ 416/132 R
2,007,963 A * 7/1935 Cleveland ............... 416/169 R (Continued)

FOREIGN PATENT DOCUMENTS

JP    58-170864    10/1983

(Continued)

*Primary Examiner*—Igor Kershteyn
(74) *Attorney, Agent, or Firm*—Armstrong, Kratz, Quintos, Hanson & Brooks, LLP

(57) ABSTRACT

The present invention relates to a windmill device rotating by a wind power. More particularly, to efficiently obtain rotating energy irrespective of a wind direction, the present invention is firstly characterized in that assuming that an outermost radius as a distance between the remotest position of each blade from the center of a vertical shaft and the vertical shaft is r1, an innermost radius as a distance between the nearest position of each blade to the vertical shaft and the vertical shaft is r2, and the angle (rad) of an arbitrary position r in an inner peripheral surface of the cross-section of the blade by regarding a line segment for connecting the remotest position from the vertical shaft to the vertical shaft as a reference is t (in this case, $0<=t<=2\pi/3$), the form of the inner peripheral surface in the cross-section of each of the three blades satisfies a following formula:

$$r=(r1-r2)\times((t-2\pi/3)\times 2)/(2\pi/3)\times 2+r2.$$

The present invention is secondly characterized in that fixed guide fins which do not rotate are provided in the outer periphery of the windmill device. The present invention is thirdly characterized in that wind introduced along the blades can be smoothly evaded outside the windmill without forming a vortex flow.

5 Claims, 17 Drawing Sheets

U.S. PATENT DOCUMENTS

| | | | |
|---|---|---|---|
| 3,942,909 A * | 3/1976 | Yengst | 416/132 B |
| 4,047,834 A * | 9/1977 | Magoveny et al. | 415/53.1 |
| 4,269,563 A * | 5/1981 | Sharak et al. | 415/186 |
| 4,359,311 A | 11/1982 | Benesh | |
| 4,362,470 A | 12/1982 | Locastro et al. | |

FOREIGN PATENT DOCUMENTS

| | | |
|---|---|---|
| JP | 59-126084 | 7/1984 |
| JP | 5-215062 | 8/1993 |
| JP | 2002-106458 | 4/2002 |
| WO | WO 99/61754 A2 | 12/1999 |

* cited by examiner (A)

(B)

(A)

(B)

THREE BLADE TYPE VERTICAL WINDMILL DEVICE

TECHNICAL BACKGROUND OF THE INVENTION

1. Technical Field to which the Invention Belongs

The present invention relates to a windmill device that is rotated by wind power and converts rotating energy into other energy such as electric energy, and more particularly to an improvement of a three blade type vertical windmill device that can efficiently obtain the rotating energy irrespectively of a wind direction, is silent so as not to mind its wind cutting sound more than a usual propeller type windmill device and eliminates an anxiety about the generation of noise even when the windmill device is disposed in a home.

2. Prior Art

As a power generation device for obtaining small electric power, for instance, a wind power generation attracts attention in view of an advantage that an environmental contamination does not arise. In the case of a usual wind power generation device, a wind generation device having a propeller provided on a horizontal shaft has been ordinarily employed. In such a wind power generation device, the propeller needs to be directed to the direction of wind. A troublesomeness of detecting the wind direction or a cost for a controller for adjusting the propeller to the wind direction is inconveniently required.

Further, as the usually known windmill device, a Savonius type windmill device as shown in FIG. 1 has been known. The Savonius type windmill device comprises a pair of upper and lower bottom plates 1 having disk shapes and a pair of plate type blade 2 having semicircular shapes in cross-section which are provided as shown in FIG. 1. This windmill device has a position (dead point) where the windmill device does not rotate due to a positional relation to a wind direction. That is, under a state shown in FIG. 1(A) (a state that wind is supplied to a position where both the blades 2 are superposed on each other), a clockwise rotating force by wind A (refer it to as a backward rotating force, hereinafter) and a counterclockwise rotating force by wind C (refer it to as a forward rotating force, hereinafter) are cancelled each other. Thus, the windmill device does not rotate. Further, under a state shown in FIG. 1(B), (a state that wind is supplied to the rear surface 2a of one blade 2), the backward rotating force by the wind A is strong, so that the rotating force of a desired direction (the forward rotating force) cannot be obtained. Accordingly, also in the Savonius type windmill device, the wind direction needs to be detected and the windmill device needs to be controlled to a state suitable for the wind direction like the above-described propeller type windmill device.

The applicant of the present invention already proposes a three blade type vertical windmill device shown in FIGS. 2 to 7 in the previously filed (Japanese Patent Application Lid-Open No. 2000-297637) in order to solve the inconveniences of the above-described usual windmill device.

In the three blade type vertical windmill device according to the previously filed application, a base 4 and an upper member 5 are fixed by a plurality (three in the case of an illustrated example) of supports 6. Between the base 4 and the upper member 5, three blades (blades 3A, 3B and 3C) which constitute a characteristic part of the present invention are provided. In the base 4, the above-described power generating means is provided. Further, in the upper member 5, various kinds of detecting means or control means (not shown) such as a wind power detector that is not shown in the drawings are provided. Various kinds of cords connected to the detecting means or the control means are extended outside from a take-out port 7 formed on the upper member 5.

Between the base 4, the upper member 5 and the supports 6, a pair of upper and lower bottom plates 8 and the three plate type blades 3A, 3B and 3C curved in their cross-section are disposed. Both the ends in the upper and lower parts of the three blades are respectively fixed to the pair of the bottom plates 8. On a center of the pair of the bottom plates 8, one vertical shaft 9 is provided integrally with each bottom plate 8. The vertical shaft 9 passes through the lower bottom plate 8 and is connected to the power generating means. The vertical shaft 9 transmits the rotating force of the above-described blades 3A, 3B and 3C to the power generating means.

The three blades 3A, 3b and 3C are disposed, as shown in FIGS. 5 to 7, under states that one side ends 3c are remote from the center O of the bottom plate 8 and the other side ends 3d are near to the center O. Distances R2 from the one side ends 3c of the blades 3A, 3B and 3C to the center O are equal and distances R1 from the other side ends 3d of the blades 3A, 3B and 3C to the center O are equal to one another between the blades 3A, 3B and 3C. The three blades 3A, 3B and 3C are located at equal intervals. The other side end part of one blade (for instance, the blade 3A) of the mutually adjacent blades (for instance the blades 3A and 3B) and the one side end part of the other blade (for instance, the blade 3B) whose one side end part is located outside the other side end part of the one blade (for instance, the blade 3A) form a wind inlet port 10.

The windmill device according to the previously filed application that is constructed as described above does not need to take the wind direction into consideration, which is different from each of the usual windmill devices as described above, and can be inexpensively produced with a simple structure. Specifically, as shown in FIG. 7(A), winds C and D collide with the back surface 3a of the blade 3A and reach the inner surface 3a of the blade 3B by the back surface 3a of the blade 3A to generate a forward rotating force. Further, wind E directly collides with the inner surface 3b of the blade 3B to similarly generate a forward rotating force. The winds C, D and E further move along the inner surface 3b of the blade 3B and collide with the inner surface 3b of the blade 3C to generate a forward rotating force. On the other hand, winds A and B collide with the blade 3C to generate a backward rotating force. However, the backward rotating force is adequately lower than the forward rotating force by the winds C, D and E. Accordingly, the windmill device efficiently rotates forward. The above-described phenomenon may be applied to a case in which wind blows from any direction. In other words, this windmill device is not affected by the wind direction even when wind blows from any direction and can efficiently obtain the rotating force.

Therefore, when the windmill device according to the previously filed application is fixed at a suitable position, even when wind blows from any direction, the above-described blades 3A, 3B and 3C assuredly rotate in a desired direction (a forward direction) so that a power can be effectively assuredly generated.

It is an object of the present invention is to provide an improved three blade type vertical windmill device in which a power generation efficiency by using the wind power of the three blade type vertical windmill device previously proposed by the applicant of the present invention can be greatly improved with a simple structure.

SUMMARY OF THE INVENTION

A three blade type vertical windmill device according to the present invention, as defined in claim 1, comprises: three plate type blades provided on a bottom plate having a vertical shaft on its center and curved; and energy converting means for converting a rotating energy by the wind power of these blades into other energy. The blades are made of plates curved in cross-sections and disposed at equal intervals under a state that one side ends are remote from the vertical shaft and the other side ends are near to the vertical shaft. Assuming that an outermost radius as a distance between the remotest position of each blade from the center of the vertical shaft and the vertical shaft is r1, an innermost radius as a distance between the nearest position of each blade to the vertical shaft and the vertical shaft is r2, and the angle (rad) of an arbitrary position r in an inner peripheral surface of the cross-section of the blade by regarding a line segment for connecting the remotest position from the vertical shaft to the vertical shaft as a reference is t (in this case, $0<=t<=2\pi/3$), the form of the inner peripheral surface in the cross-section of the blade satisfies a following formula:

$$r=(r1-r2)\times((t-2\pi/3)\times2)/(2\pi/3)\times2+r2.$$

Further, a three blade type vertical windmill device according to the present invention comprises, as defined in claim 2, as other means for improving the rotating efficiency of blades, three fixed guide fins provided upright at equal intervals along the outer periphery of the base for holding the three blades at equal interval. Each fixed guide fin is inclined at an angle larger than a tangential direction relative to the rotating locus of the outer peripheral end of each of the three blades.

In this case, as defined in claim 3, the width and angle of the fixed guide fin are set in such a manner that when the angle of a wind direction is at right angles to the fin, the outer end part of the fixed guide fin is larger than the rotating locus of the outer peripheral end of the blade.

Further, in the three blade type windmill device according to any of claims 1 to 3, as defined in claim 5, the long side part of the blade is freely opened and closed on a point of the curved part as a center to freely adjust the opening degrees of the short side part and the long side part. When a wind power is low, the opening degree is desirably increased, and when the wind power is high, the opening degree is desirably decreased.

Further, in a three blade type vertical windmill device that rotates by a wind power and converts rotating energy to other energy, as other means for improving the rotating efficiency of blades, as defined in claim 6, the windmill device comprises: a bottom plate having a vertical shaft protruding on its center; and three plate type blades having their lower ends or upper ends fixed to the bottom plate and curved in their cross-sections. The vertical shaft is formed in a tubular shape and a prescribed number of vent through holes are opened on the tubular body.

Further, in the three blade type vertical windmill device according to the present invention, as other means for improving the rotating efficiency of the blades, as defined in claim 7, the three blade type vertical windmill device defined in any of claims 1 to 3 or claim 5 is combined with a structure defined in claim 6.

BRIEF DEASCRIPTION OF THE DRAWINGS

FIG. 1 shows a usually well-known Savonius type windmill device.

FIGS. 1(A) and 1(B) are plan views for explaining the positions of blades relative to a wind direction and the rotation thereof.

BEST MODE FOR CARRYING OUT THE INVENTION

Now, a basic structure of a three blade type vertical windmill device according to a first embodiment of the present invention will be described by referring to FIG. 8.

Figure 1:
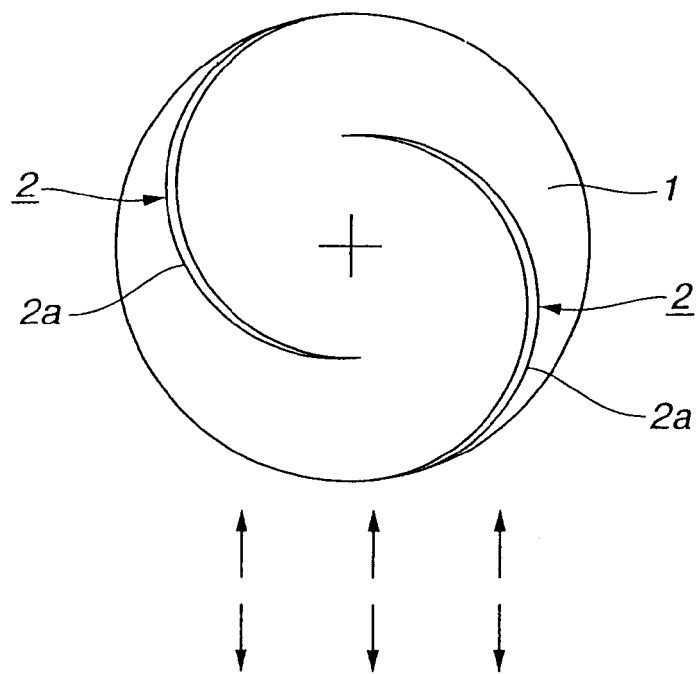
Figure 1:
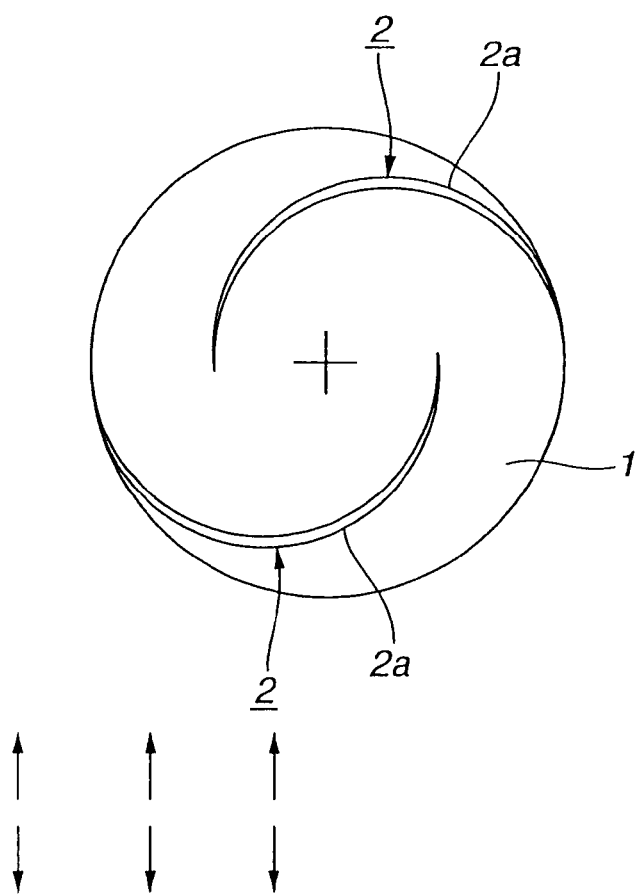
Figure 2:
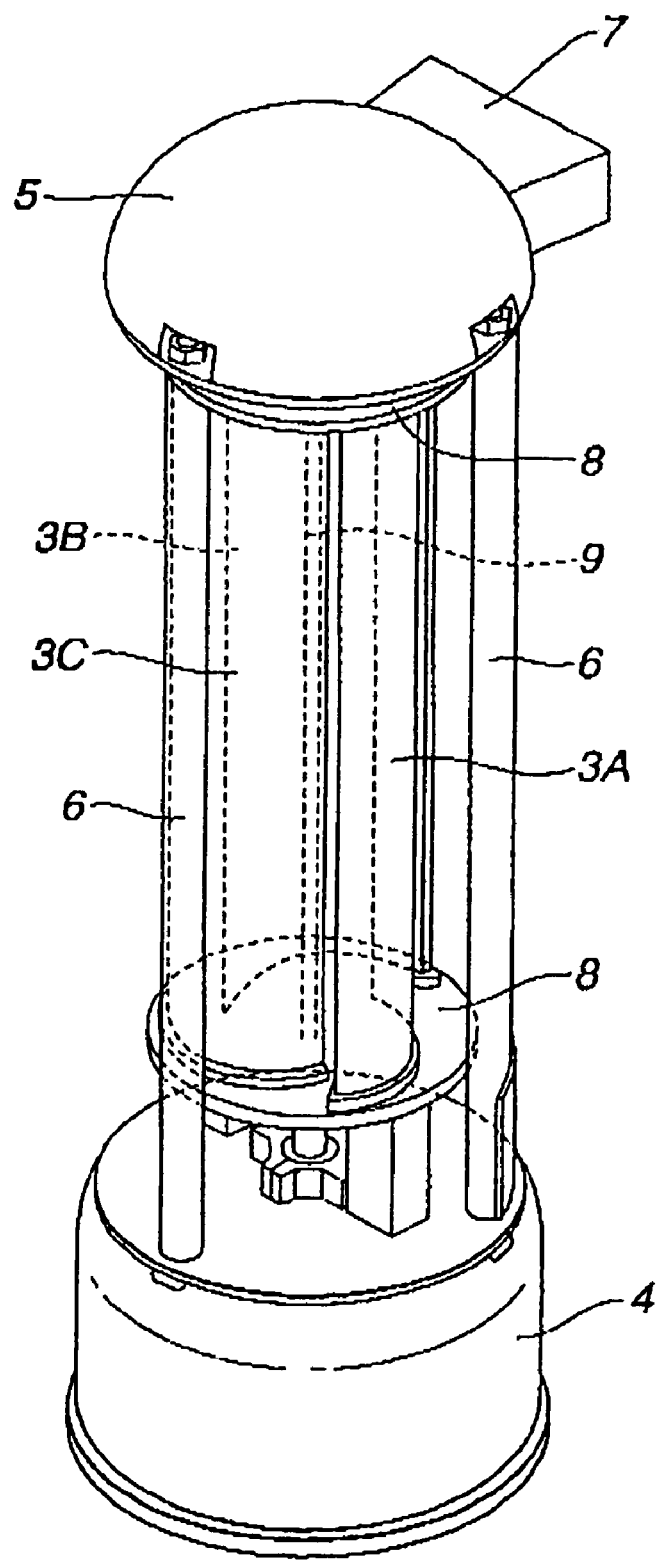
FIG. 2 is a perspective view of a three blade type vertical windmill device previously proposed by the applicant of the present invention.
Figure 3:
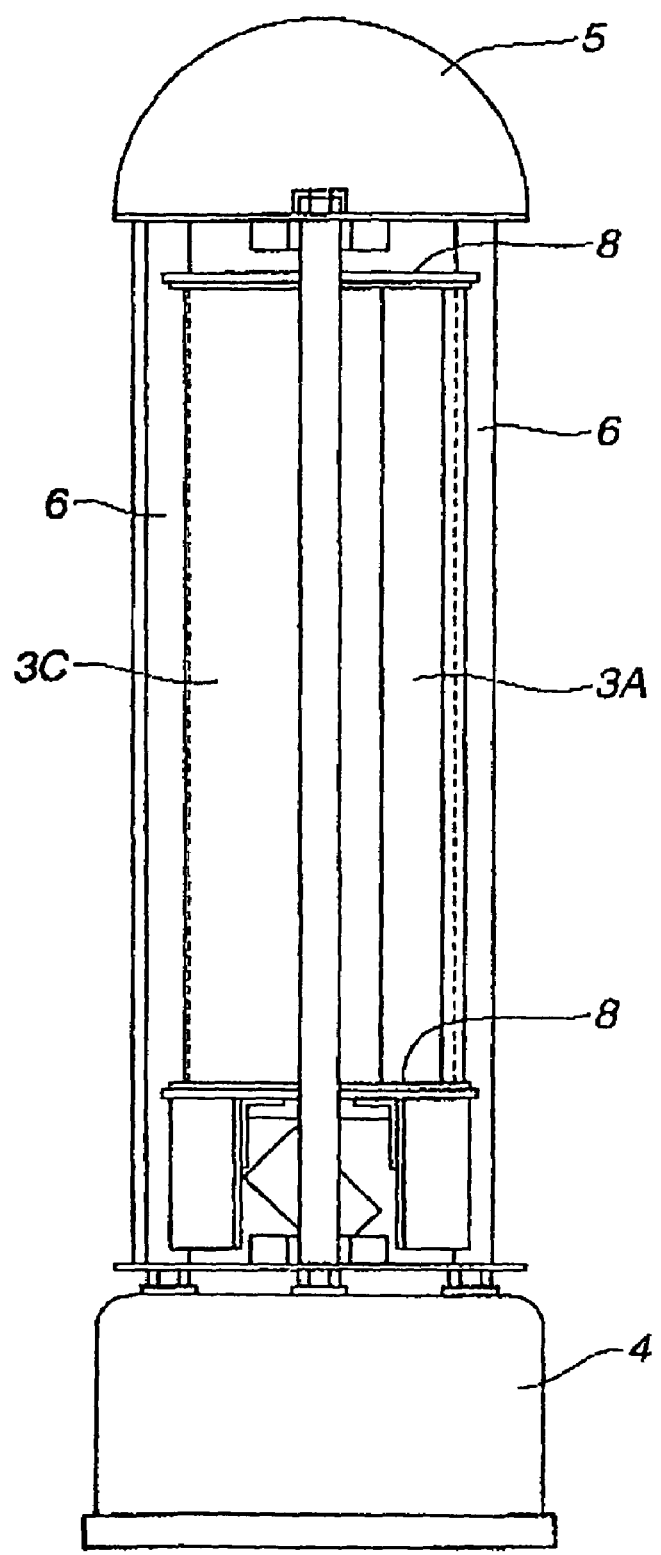
FIG. 3 is a front view of the above-described three blade type vertical windmill device.
Figure 4:
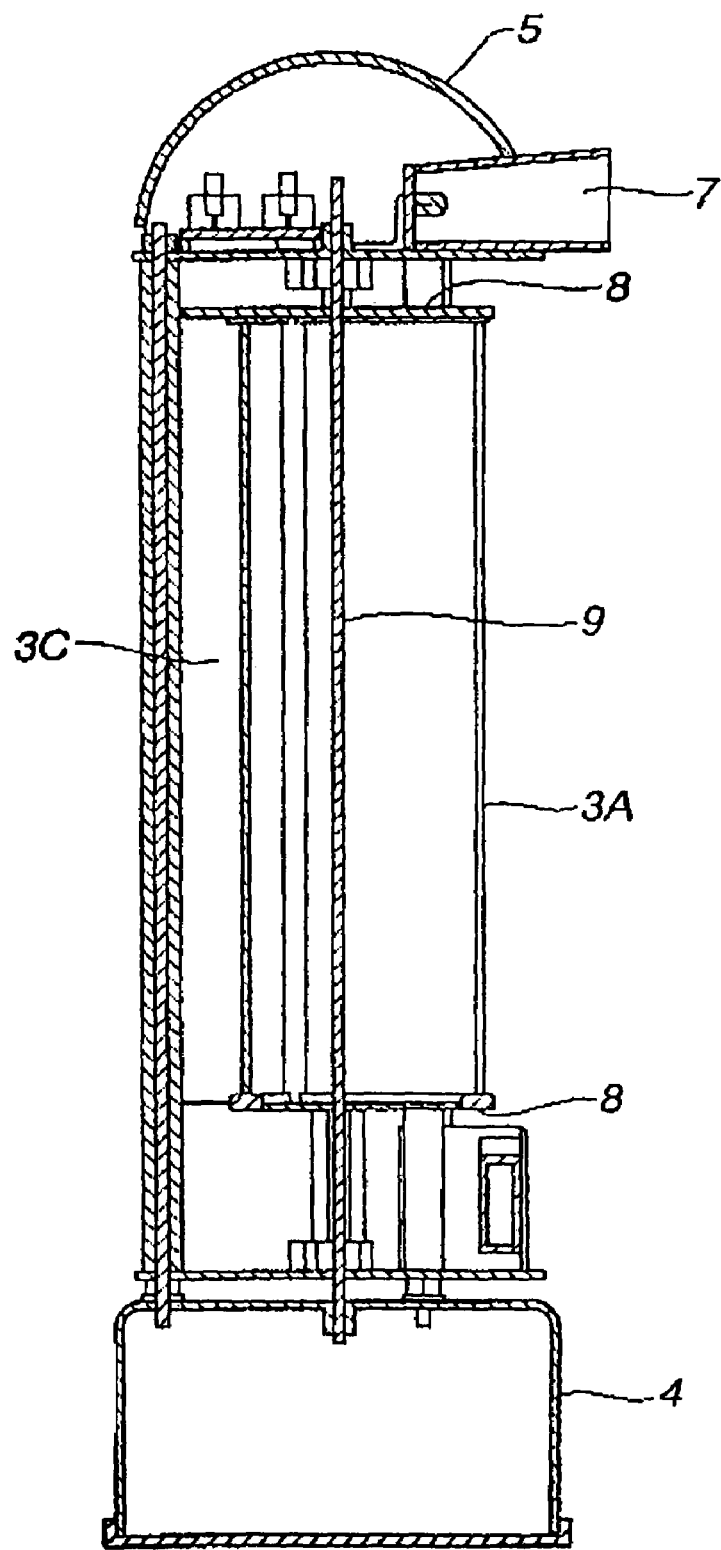
FIG. 4 is a longitudinal side sectional view of the above three blade type vertical windmill device with a part omitted.
Figure 5:
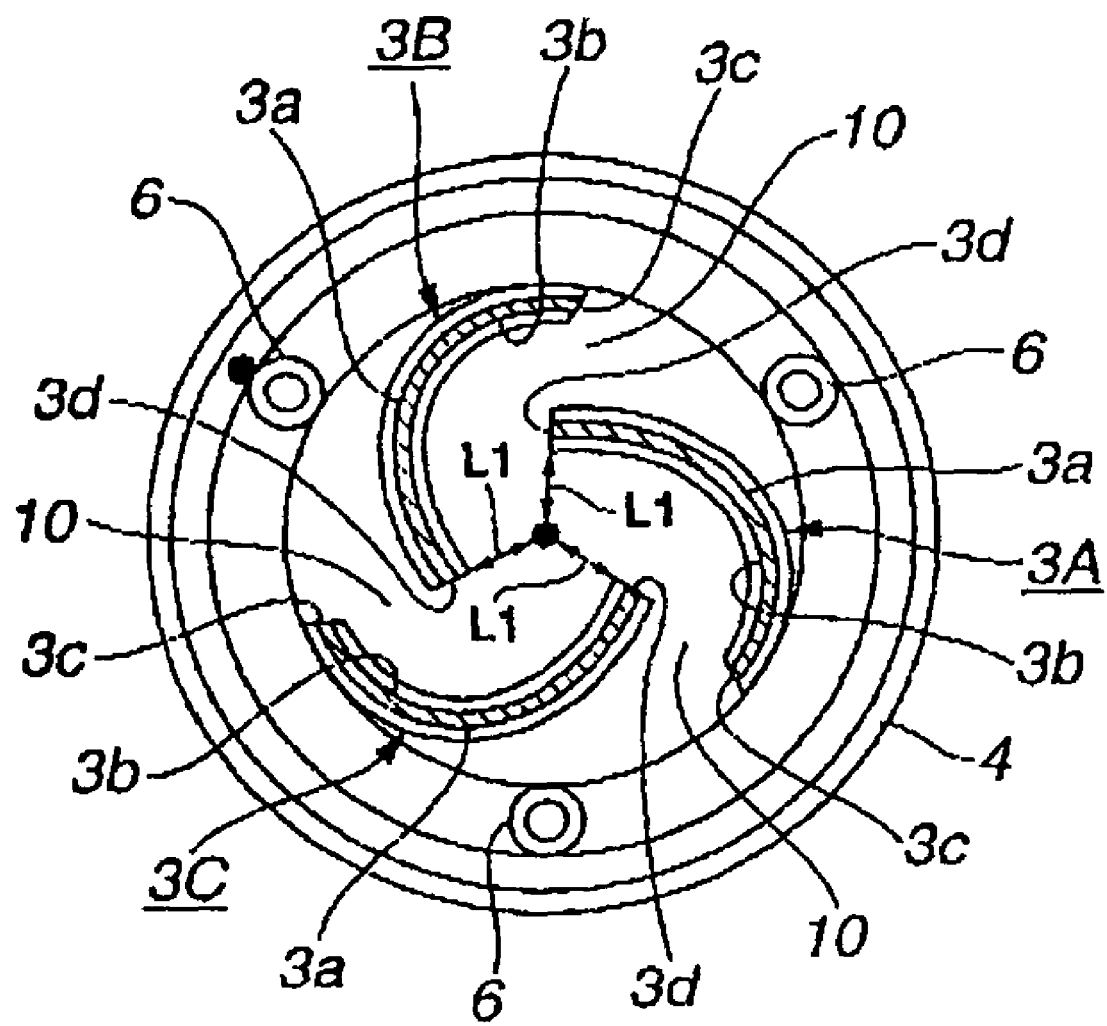
FIG. 5 is a cross-sectional view of the above three blade type vertical windmill device.
Figure 6:
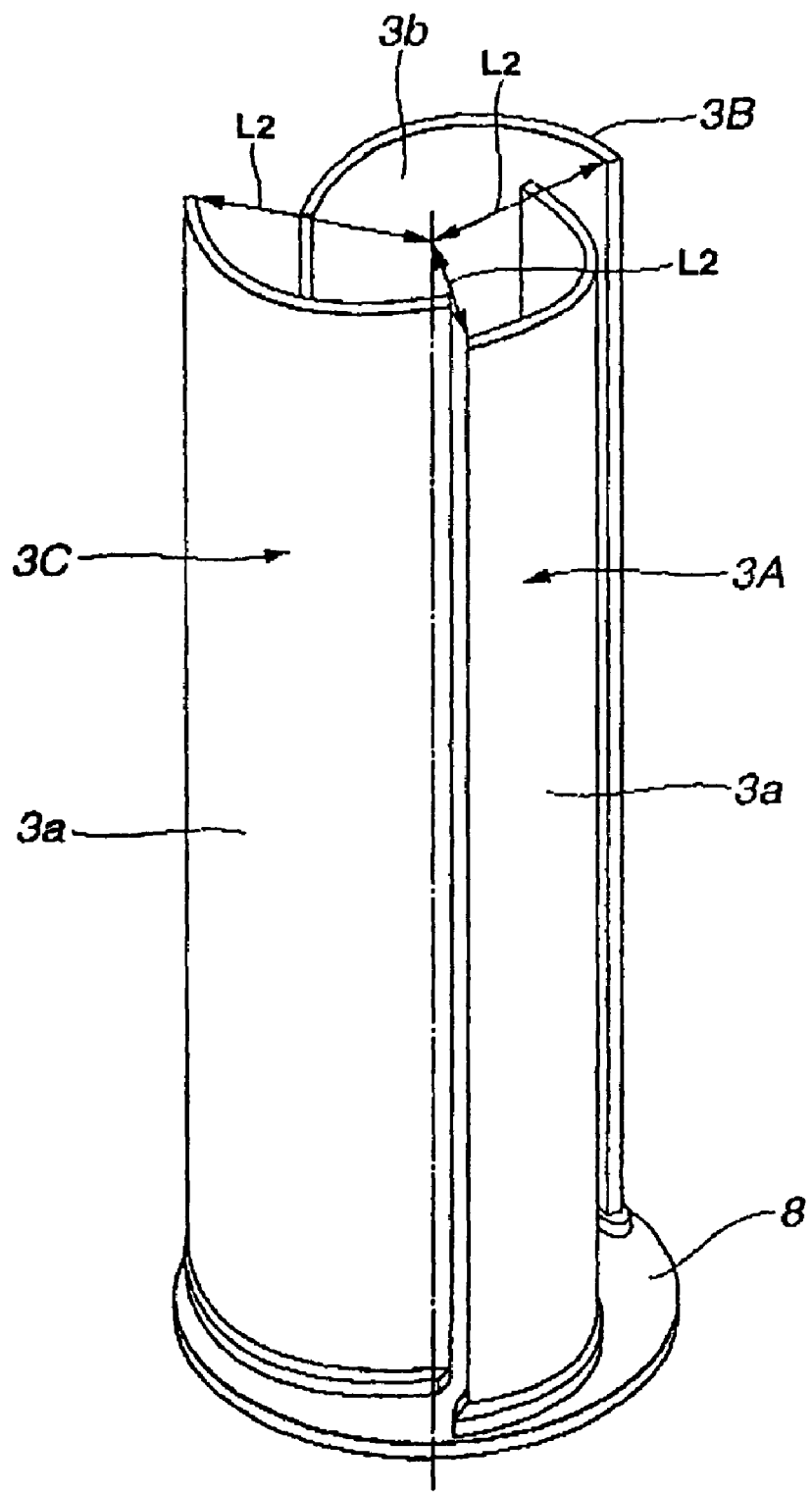
FIG. 6 is a perspective view of the above three blade type vertical windmill device showing that a part for disposing blades is taken out.
Figure 7:
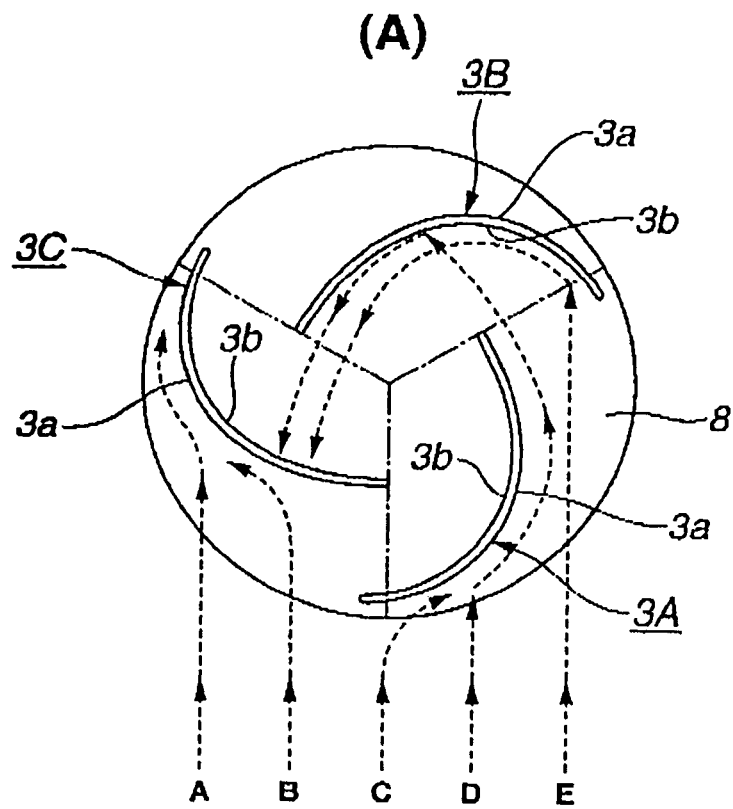
FIG. 7 is plan view for respectively explaining a rotating force due to the positional relation of the blades of the above three blade type vertical windmill device.
Figure 7:
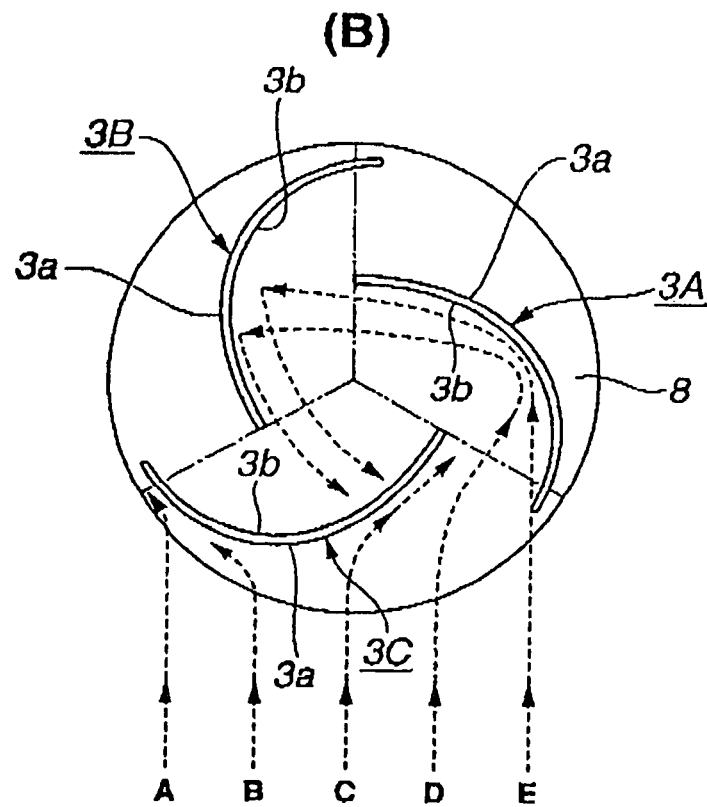
Figure 8:
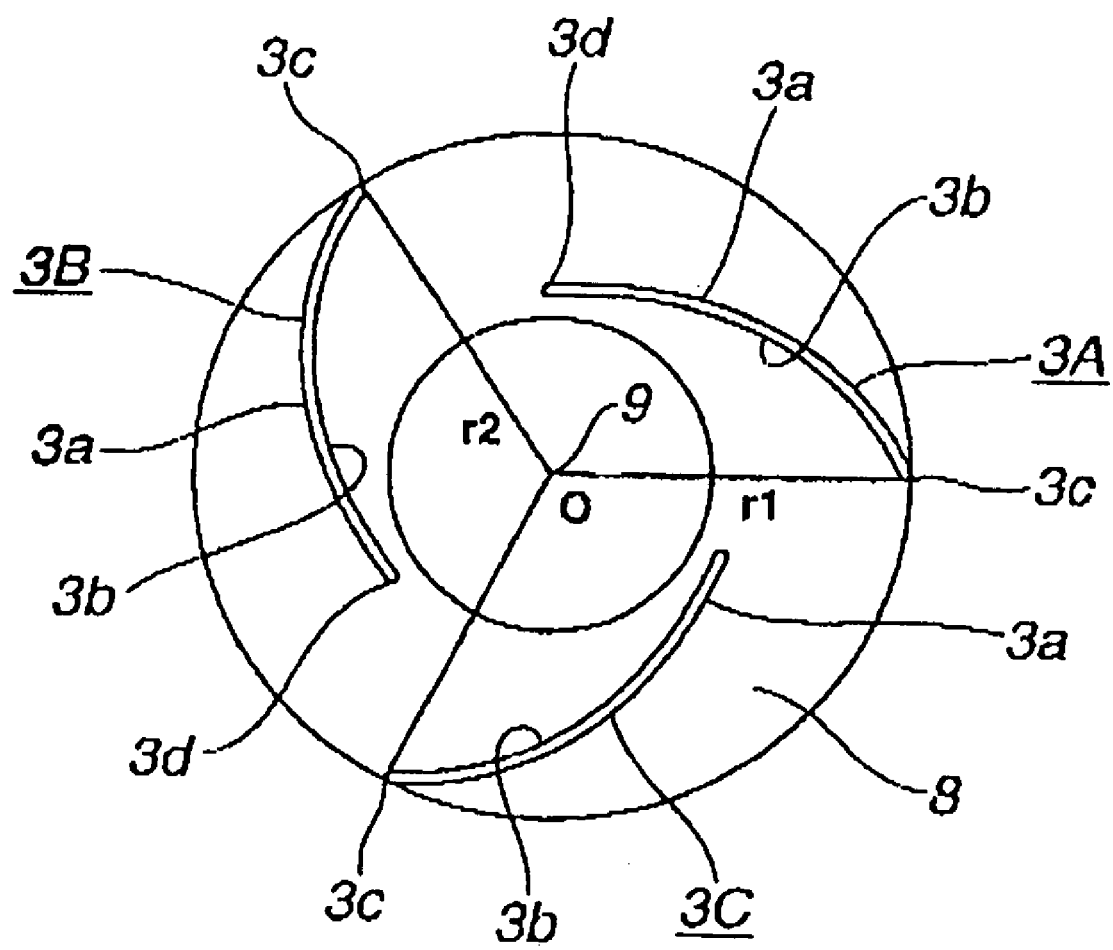
FIG. 8 is an explanatory view showing the characteristic part of a three blade type vertical windmill device according to a first embodiment of the present invention.

In the three blades 3A, 3B and 3C of the three blade type vertical windmill device according to this embodiment, as shown in FIG. 8, assuming that an outermost radius as a distance between the remotest position 3c from a vertical shaft 9 and the vertical shaft 9 is r1, an innermost radius as a distance between the nearest position 3c of each of the blades 3A, 3B and 3C to the vertical shaft 9 and the vertical shaft 9 is r2, and the angle (rad) of an arbitrary position r in an inner peripheral surface 3b of the cross-section of the blade by regarding a line segment for connecting the remotest position 3d from the vertical shaft 9 to the vertical shaft 9 as a reference is t (wherein, 0<=t<=2π/3), and a coefficient is a, r can be expressed by the following formula by considering the rotation of the blades 3A, 3B and 3C.

$$r=(r1-r2)\times((T-2\pi/3)=2)/(2\pi/3)\times 2+r2 \ldots (1)$$

Then, since when t is 0, r is equal to r1. t=0 is substituted for the above-described formula (1) to have a following formula.

$$r1=a\times((2\pi/3)\times 2)+r2 \ldots (2)$$

The formula (2) is transformed to have a following formula.

$$a=(r1-r2)\times((2\pi/3)\times 2)$$

The above a is substituted for the formula (1) to obtain the above-described formula, that is, $$r=(r1-r2)\times((t-2\pi/3)\times 2)/(2\pi/3)\times 2+r2$$

In the drawing, reference numeral 3a designates an outer peripheral surface of each of the blades 3A, 3B and 3C.

Accordingly, in the three blade type vertical windmill device according to this embodiment, the inner peripheral surface 3b in the cross-section of each blade 3A, 3B, or 3C is formed so as to satisfy the following formula.

$$r=(r1-r2)\times((T-2\pi/3)\times 2)/(2\pi/3)\times 2+r2$$

Thus, according to an experiment, it was recognized that the flow of wind along the inner peripheral surface 3b in the cross-section of each of the blades 3A, 3B and 3C is directed so as to rotate each of the blades 3A, 3b and 3C without wastefulness.

Further, when an experiment was performed that the previously filed three blade type vertical windmill device was compared with the three blade type vertical windmill device in view of rotating speed for unit time or a quantity of generated power, the three blade type vertical windmill device according to this embodiment was more excellent than the former in respect of both items.

In other words, as understood, the inner peripheral surface 3b in the cross-section of each of the blades 3A, 3B and 3C is formed as described above, so that while various kinds of effects of the previously filed three blade type vertical windmill device are maintained as they are, the rotating efficiency of the three blade type vertical windmill device according to this embodiment is improved.

As described above, while the three blade type vertical windmill device according to this embodiment can be inexpensively produced with a simple structure, the three blade type vertical windmill device is not affected by a wind direction and can obtain the rotating energy more efficiently than the previously filed three blade type vertical windmill device. Since each blade rotates on the vertical shaft as a center, the three blade type vertical windmill device according to this embodiment is silent so as not to mind its wind cutting sound as compared with a usual propeller type windmill device and eliminates an anxiety about the generation of noise when the windmill device is disposed in a home.

Figure 9:
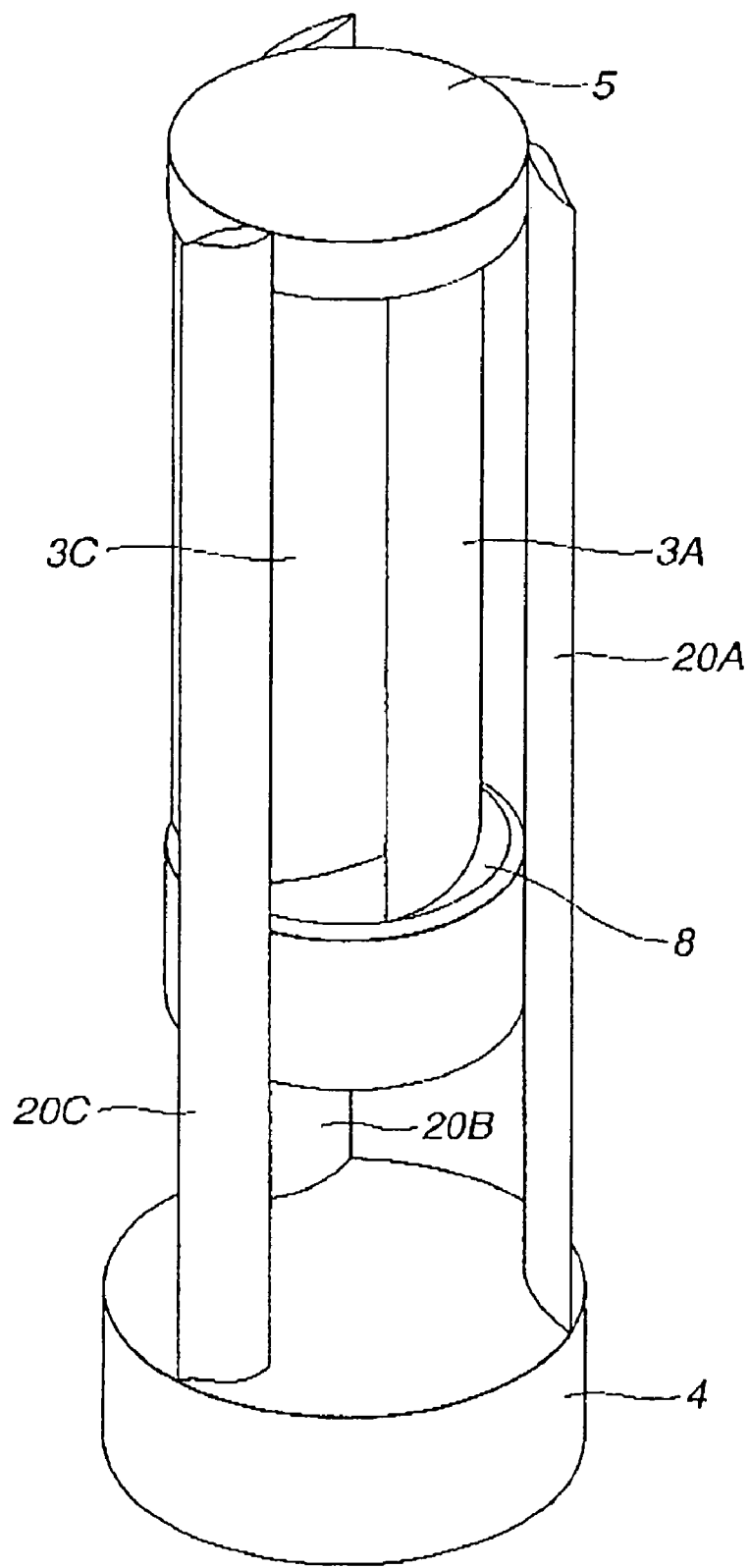
FIG. 9 is a perspective view showing a schematic structure of a three blade type vertical windmill device according to a second embodiment of the present invention.

FIGS. 9 to 15 show a three blade type vertical windmill device according to a second embodiment of the present invention. In the three blade type vertical windmill device according to this embodiment, as shown in FIG. 9, a base 4 and an upper member 5 are connected together and fixed by three fixed guide fins 20A, 20B and 20C as other means for efficiently rotating a windmill irrespective of a wind direction. Between the base 4 and the upper member 5 and the fixed guide fins 20A, 20B and 20C, blades 3A, 3B and 3C as three blades are provided. In the base 4, power generating means like the windmill device according to the previously filed application is provided. Further, in the upper member 5, various kinds of detecting means or control means (not shown) such as a wind power detector that is not shown in the drawings are provided. Various kinds of cords connected to the detecting means or the control means are extended outside from a take-out port (not shown) formed on the upper member 5.

Between the base 4, the upper member 5 and the fixed guide fins 20A, 20B and 20C, a pair of upper and lower bottom plates 8 and the three plate type blades 3A, 3B and 3C curved in their cross-sections are disposed. Both the ends in the upper and lower parts of the three blades are respectively fixed to the pair of the bottom plates 8. On a center of the pair of the bottom plates 8, one vertical shaft 9 (see FIGS. 9 to 14) is pivoted integrally with each bottom plate 8.

The vertical shaft 9 passes through the lower bottom plate 8 and is connected to the power generating means. The vertical shaft 9 transmits the rotating force of the above-described blades 3A, 3B and 3C to the power generating means.

Figure 10:
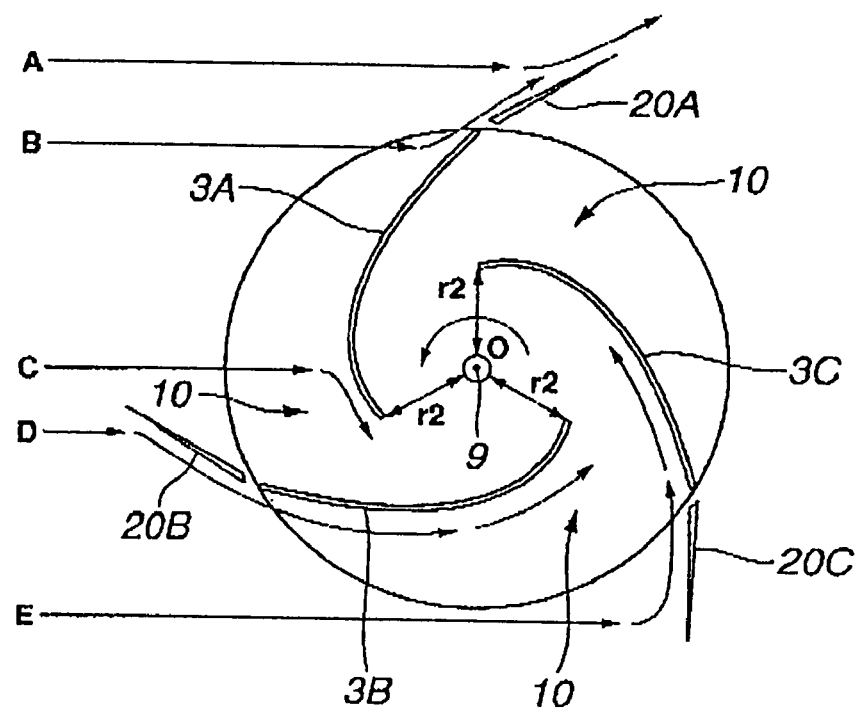
FIG. 10 is a plan view for explaining a rotating force under a first positional relation in the blades of the above three blade type vertical windmill device.

The three blades 3A, 3B and 3C are disposed, similarly to the first embodiment, under states that one side ends 3c are remote from the center O of the bottom plate 8 and the other side ends 3d are near to the center O. As shown in FIGS. 9 and 10, distance r2 from the one side ends 3c of the blades 3A, 3B and 3C to the center O are equal and distances r1 from the other side ends 3d of the blades 3A, 3B and 3C to the center O are equal to one another between the blades 3A, 3B and 3C. The three blades 3A, 3B and 3C are located at equal intervals. The other side end part of one blade (for instance, the blade 3A) of the mutually adjacent blades (for instance the blades 3A and 3B) and the one side end part of the other blade (for instance, the blade 3B) whose one side end part is located outside the other side end part of the one blade (for instance, the blade 3A) form a wind inlet port 10.

Further, the three fixed guide fins 20A, 20B and 20C have functions as supports and thick base parts whose planes (horizontal sections) are substantially formed in the shapes of water drops are fixed along the outer peripheral surfaces of the upper member 5 and the lower bottom plate 8 at intervals of 120 degrees, as shown in FIG. 9. The lower end parts of the fixed guide fins are upright on the bottom plate 4 at the above-described intervals.

Further, the three fixed guide fins 20A, 20B and 20C are respectively inclined at an angle larger than the outer peripheral surfaces of the upper member 5 and the lower bottom plate 8, that is, a tangential direction relative to the rotating locus of each of the blades 3A, 3B and 3C. The width and angle of each of the fixed guide fins 20A, 20B and 20C are desirably set so that an optimum sectional form can be obtained on the basis of hydrodynamics. The width and angle of the fixed guide fins are effectively set in such a manner that at least when the angle of a wind direction is at right angles to the fins 20A, 20B and 20C, the outer end parts of the fixed guide fins are larger than the rotating loci of the outer peripheral ends of the blades 3A, 3B and 3C. When the width of the fins are too large, a turbulent air flow is generated about the windmill. Accordingly, the characteristics of the three blade windmill cannot be made a good use of and the rotating force is the more reduced.

In the three blade vertical type windmill device according to this embodiment, the three blade vertical type windmill device can be inexpensively produced, in which the wind direction does not need to be considered as in each of the above-described usual windmill devices and a power generating efficiency can be greatly improved with a simple structure as described below.

Specifically, in the case of a positional relation shown in FIG. 10, and A collides with the fixed guide fin 20A, however, the wind A does not give any influence to the rotating force. Wind B serves as a backward rotating force irrespective of the presence and absence of the fixed guide fins and wind C also contributes to the rotating force irrespective of the presence or absence of the fixed guide fins. Wind D collides with the fixed guide fin 20B, flows along the blade 3B and collides with the blade 3C to contribute to the rotating force. However, when the fixed guide fin 20B does not exist, the wind will collide with the blade 3B to contribute to the rotating force. Accordingly, the contribution to the rotating force by the wind D consequently constitutes a minus factor. Wind E essentially deviates a range of the windmill so that the wind does not contribute to the rotating force, however, the wind E collides with the fixed guide fin 20C and is guided to the blade 3C to contribute to the rotating force. Accordingly, in the case of the positional relation shown in FIG. 10, the rotating force entirely serves as a plus factor.

Figure 11:
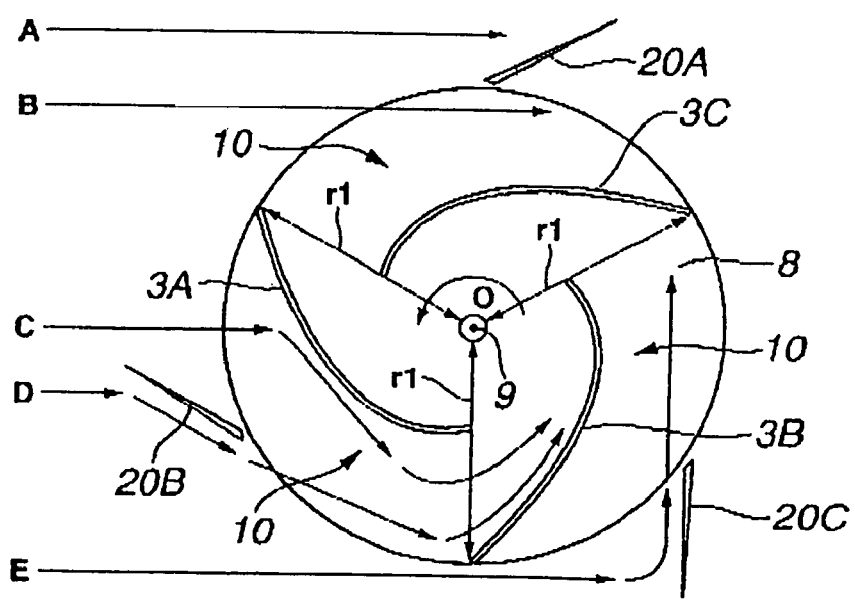
FIG. 11 is a plan view for explaining a rotating force under a second positional relation in the blades of the above three blade type vertical windmill device.

Then, in a positional relation shown in FIG. 11, winds A, B, C and D operate in the same manner as that of FIG. 10. Wind E is not essentially related to the rotation of the windmill like FIG. 10. In this embodiment, the wind E collides with the fixed guide fin 20C and is guided to the blade 3C to contribute to the rotating force. Also in the positional relation shown in FIG. 11, the rotating force entirely functions as a plus.

Figure 12:
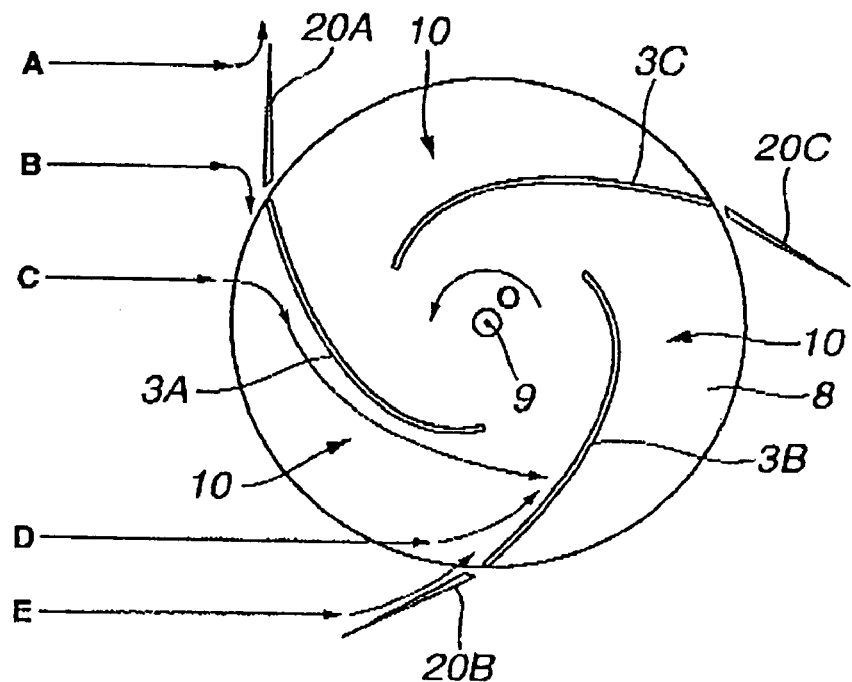
FIG. 12 is a plan view for explaining a rotating force under a third positional relation in the blades of the above three blade type vertical windmill device.

Then, in a positional relation shown in FIG. 12, wind A collides with the fixed guide fin 20A to deviate outside the windmill. When this fixed guide fin 20A does not exist, the wind A interrupts the rotation of the blade 3C. However, since the fixed guide fin 20A exists, a backward rotating force to the windmill can be effectively interrupted. Further, wind B collides with the fixed guide fin 20A to move along the blade 3A and contribute to the rotating force. Winds C and D act in the same manner as that when the fixed guide fin does not exist.

Figure 13:
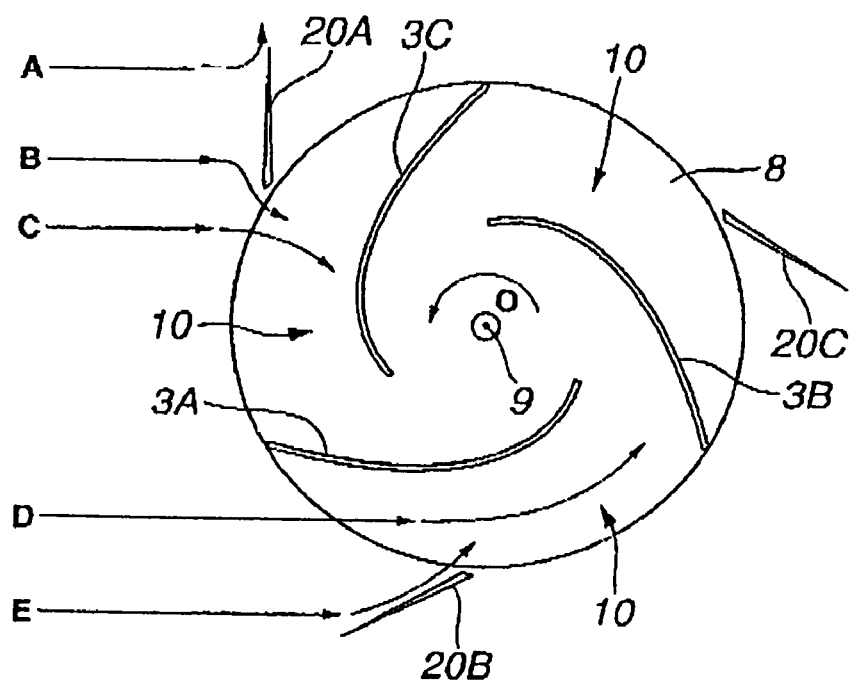
FIG. 13 is a plan view for explaining a rotating force under a fourth positional relation in the blades of the above three blade type vertical windmill device.

Then, in a positional relation shown in FIG. 13, wind A collides with the fixed guide fin 20A to deviate outside the windmill. When this fixed guide fin 20A does not exist, the wind A interrupts the rotation of the blade 3C. However, since the fixed guide fin 20A exists, a backward rotating force to the windmill can be effectively interrupted. Further, wind B collides with the fixed guide fin 20A to flow toward the blade 3C. Wind C collides with the blade 3C to contribute to the rotating force. Wind D moves along the blade 3B to the rotation of the windmill. Further, wind E collides with the fixed guide fin 20B and is guided so as to move along the blade 3B and contribute to the rotation of the windmill.

Figure 14:
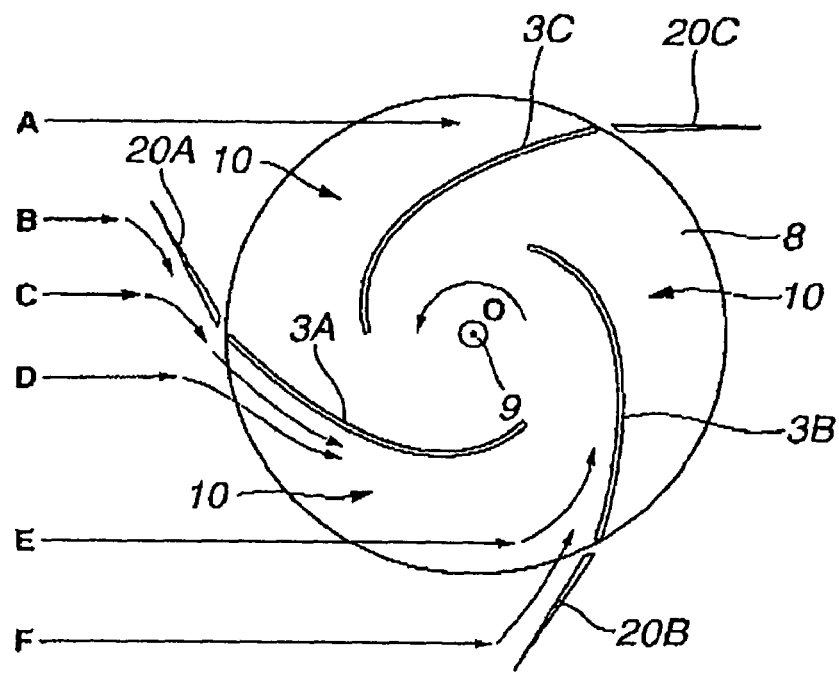
FIG. 14 is a plan view for explaining a rotating force under a fifth positional relation in the blades of the above three blade type vertical windmill device.

Then in a positional relation shown in FIG. 14, wind A flows in the same manner as that when the fixed guide fin does not exist. Further, wind B and wind C collide with the fixed guide fin 20A to move along the blade 3A and contribute to the rotation of the blade 3B. When the fixed guide fin 20A does not exist, the winds B and C collide with the blade 3C to generate a backward rotating force. Accordingly, the provision of the fixed guide fin 20A has a larger plus factor in view of increase of the rotating force. Further, winds D and E act in the same manner as that when the fixed guide fin is not provided. Further, wind F collides with the fixed guide fin 20B and is guided to the blade 3B to contribute to the rotating force. When the fixed guide fin 20B is not provided, the wind F moves outside the windmill and does not contribute to the rotating force.

Figure 15:
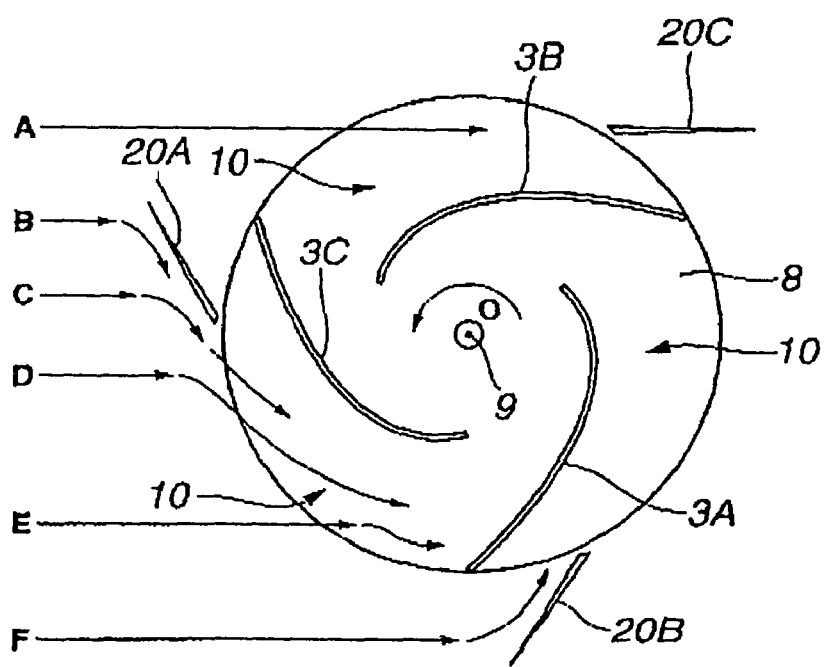
FIG. 15 is a plan view for explaining a rotating force under a sixth positional relation in the blades of the above three blade type vertical windmill device.

Further, in a positional relation shown in FIG. 15, wind A flows in the same manner as that when the fixed guide fin does not exist. Wind B and wind C collide with the fixed guide fin 20A to contribute to the rotating force of the blade 3A. However, when the fixed guide fin 20A is not provided, the wind B and the wind C move in the same manner as described above. As a result, the wind B and C hardly contribute to the increase of the rotating force. Further, winds D and E move in the same manner as that when the fixed guide fin is not provided. Further, wind F collides with the fixed guide fin 20B to move along the blade 3A, collide with the blade 3B and contribute to the rotating force. When the fixed guide fin 20B does not exist, the wind F moves outside the windmill so that the wind F does not contribute to the rotating force.

Accordingly, when the three blade type vertical windmill device according to this embodiment is fixed to a suitable position, even if wind blows from any direction, the above-described blades 3A, 3B and 3C assuredly rotate in desired directions (forward directions), so that a power can be assuredly generated. The dimensions of the three blade type vertical windmill device according to this embodiment are set in accordance with the quantity of generated power. When a small quantity of electric power may be generated, for instance, the entire height is set to about 50 cm. The dimensions are merely related to matters in design.

Figure 16:
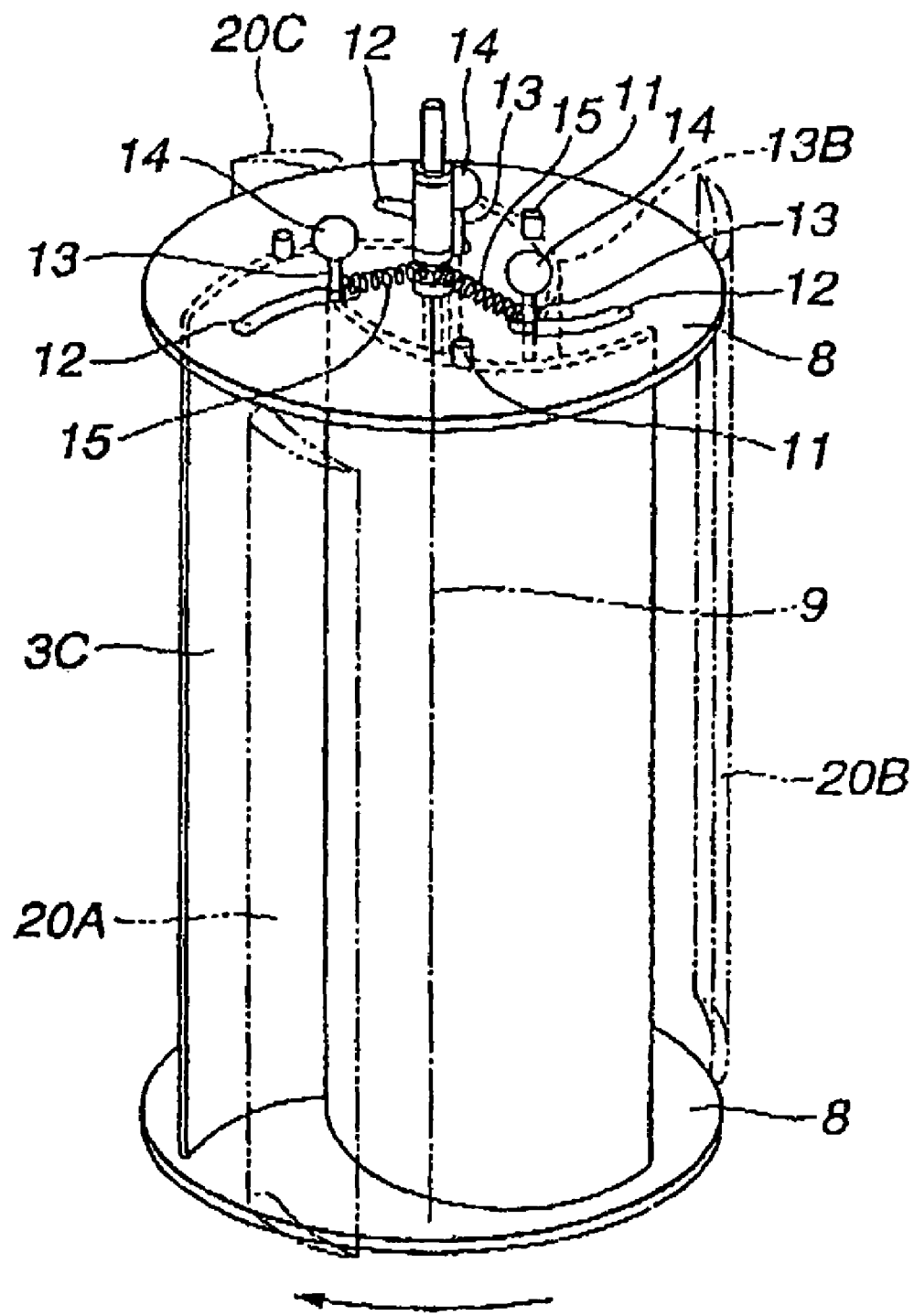
FIG. 16 is a perspective view of a three blade type vertical windmill device according to a third embodiment of the present invention showing that a part for disposing blades is taken out.
Figure 17:
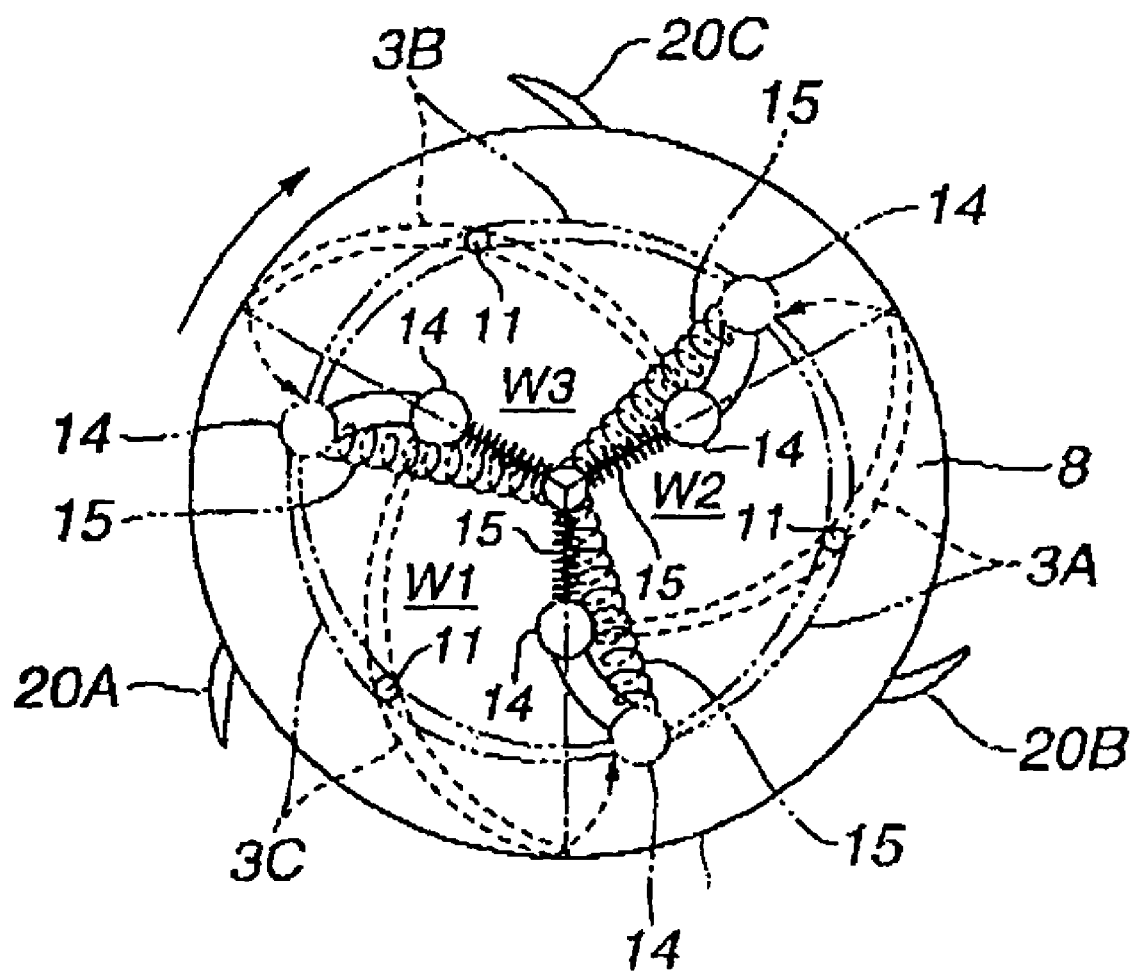
FIG. 17 is a plan view for explaining the operation of opening degree adjusting means.

Then, FIGS. 16 and 17 show a third embodiment of the present invention. This embodiment relates to a three blade type vertical windmill device that can efficiently generate a power for wind which is not so strong. Parts constructed similarly to those of the above-described second embodiment are designated by the same reference numerals and a duplicated explanation is omitted and the characteristic part of this embodiment is mainly described below.

The three blade type vertical windmill device according to this embodiment comprises a pair of upper and lower bottom plates 8 and three support shafts 11 separated by an equal distance from the center of the bottom plate 8 and provided at equal intervals. Three blades 3A, 3B and 3C are attached through the support shaft 11 so as to freely rotate. Three fixed guide fins 20A, 20B and 20C are disposed outside the bottom plates 8 like the first embodiment. The forms of the blades 3A, 3B and 3C in their cross-sections according to this embodiment are ⅓ circular arc forms, as shown in FIGS. 16 and 17. Further, in the pair of bottom plates 8, as shown in FIG. 16, three guides 12 made of ⅓ arcuate through holes are formed. Protruding parts 13 provided in the one side ends of the blades 3A, 3B and 3C are inserted into the guides 12. Further, on the end parts of the protruding parts 13 protruding from the bottom plate 8, weights 14 are fixed. The other ends of extension coil springs 15 whose one ends are engaged with the protruding parts 13 are engaged with a vertical shaft 9. The guides 12, the protruding parts 13, the weights 14, the extension coil springs 15 and a part of the shaft 9 form rotating quantity adjusting means for rotating the blades 3A, 3B and 3C by suitable quantity in accordance with a wind power.

In the three blade type vertical windmill device according to the third embodiment constructed as described above, an effective rotating force can be obtained upon weak wind. That is, in case such a construction is employed, when wind that collides with the blades 3A, 3B and 3C, respectively is weak, the one end part of each of the blades 3A, 3B and 3C is pulled to a limit point of the central side of the bottom plate 8 by the resilient force of the extension coil spring 15 as shown by a broken line in FIG. 16 and by a full line in FIG. 17, respectively. The weights 14 respectively reach positions of W1, W2 and W3 and the blades 3A, 3B and 3C are respectively located at positions shown by broken lines in FIG. 16 and by full lines in FIG. 17 to most efficiently rotate.

When the wind becomes strong from this state, the rotating speed of the blades 3A, 3B and 3C is increased, so that the blades 3A, 3B and 3C rotate on the support shafts 11 by the centrifugal force of the weights 14. Then, the blades change the positions so that the resilient force of the extension coil springs 15 and the centrifugal force are balanced. Since the blades 3A, 3B and 3C rotate along the guides 12 provided in the pair of bottom plates 8, the rotation can be smoothly carried out.

Further, for instance, the intensity of wind that collides with the blades 3A, 3B and 3C is increased under the actions of the fixed guide fins 20A, 20B and 20C, the positional relation of the blades 3A, 3b and 3C change as described above. Thus, a rotating efficiency is lowered so that rotating speed does not reach prescribed rotating speed or higher. Further, upon strong wind, the weights 14 respectively reach limit positions of opposite sides by a two-dot chain line in FIG. 17 and the blades 3A, 3B and 3C respectively close to form a cylindrical configuration as shown by two-dot chain lines in FIGS. 16 and 17 respectively. As a result, the blades 3A, 3B and 3C do not rotate. When the intensity of the wind falls, the positions of the weights respectively change so that the blades 3A, 3B and 3C take suitable positions to urge the rotating force to be increased. Accordingly, the windmill device is not broken due to the strong wind and the rotating force can be efficiently obtained. Other structures and operations are the same as those of the above-described second embodiment.

Figure 18:
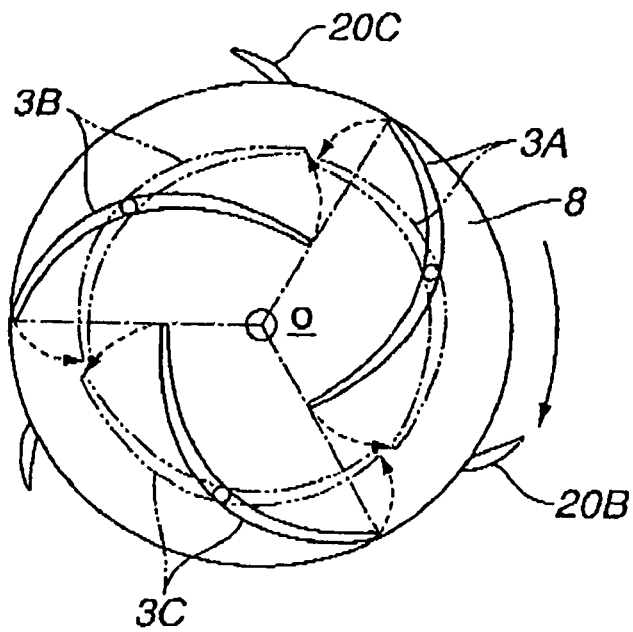
FIG. 18 is a plan view showing the forms of blades of a three blade type vertical windmill device according to a fourth embodiment of the present invention.
Figure 19:
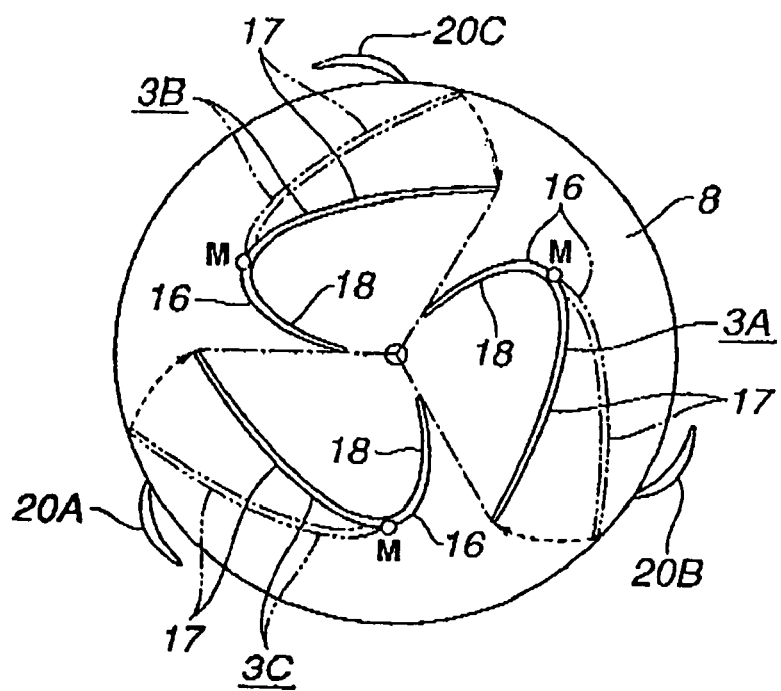
FIG. 19 is a plan view showing the operating states of the blades.

FIGS. 18 and 19 show a fourth embodiment of the present invention. Conversely to the above-described third embodiment, a windmill device according to this embodiment is formed so as to efficiently obtain a rotating force upon strong wind. In this embodiment, parts constructed similarly to those of the second embodiment are designated by the same reference numerals as those of the second embodiment and the detailed explanation thereof is omitted here. It is to be understood that fixed guide fins 20A, 20B and 20C as characteristic structures of the present invention are disposed outside a bottom plate 8 like the second embodiment and the third embodiment.

Specifically, the form of each of blades 3A, 3B and 3C in its cross-section is configured in a substantially J-shape including a curved part 16, a long side part 17 extending from one end of the curved part 16 and a short side part 18 extending from the other end of the curved part 16. Further, in this embodiment, the long side parts 17 of the blades 3A, 3B and 3C can be freely opened and closed on one points M of the curved parts 16 as centers between states shown by full lines in FIG. 19 and states shown by two-dot chain lines in FIG. 19. This opening and closing operation can be performed by, for instance, winding or rewinding a line member connected to the long side parts 17 (for instance, a piano wire) that is not shown in the drawing. Then, the long side parts 17 can be freely opened and closed on one points M of the curved parts 16 as the centers as described above. Thus, the opening degrees of the short side parts 18 and the long side parts 17 are adjustable. When the wind power is low, the opening degrees are increased. When the wind power is high, the opening degrees are decreased.

In the fourth embodiment, the use of the above-described structure makes it possible to reduce the air resistance of the blades 3A, 3B and 3C themselves upon rotation at high speed. Further, wind strongly collides with the blades 3A, 3B and 3C under the actions of the fixed guide fins 20A, 20B and 20C so that the windmill can rotate at high speed. That is, the line member connected to the long side parts 17 is rewound (the long side parts 17 are pushed) by, for instance, driving an electric motor or wound (the long side parts 17 are pulled) to adjust the opening degrees. In this case, detecting means such as an anemometer for directly or indirectly detecting the wind power may be provided and the opening degree adjusting means may be operated on the basis of the detected results of the detecting means. In this case, since the opening degree is automatically adjusted, a troublesome work can be saved.

Figure 20:
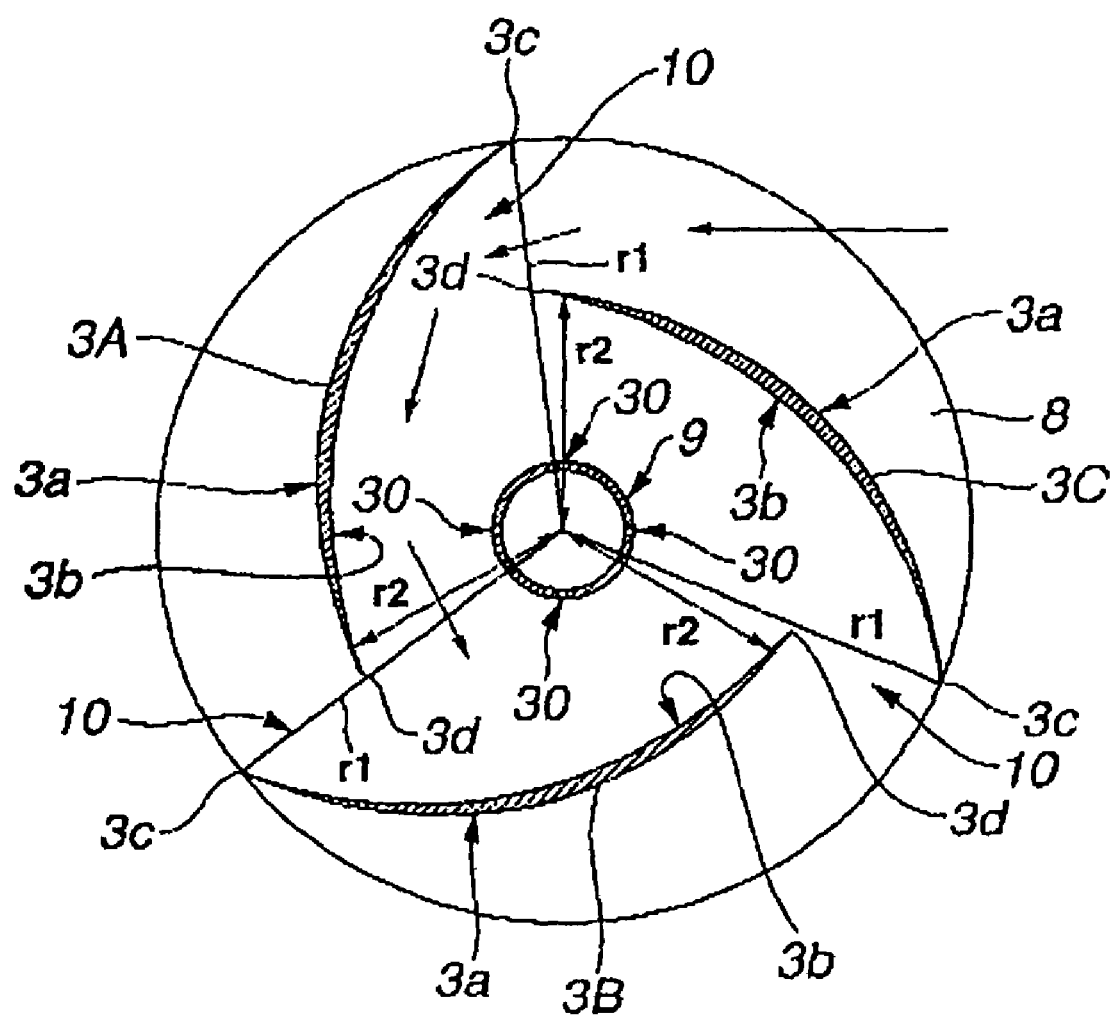
FIG. 20 is a plan view showing a schematic structure of a three blade type vertical windmill device according to a fifth embodiment of the present invention.
Figure 21:
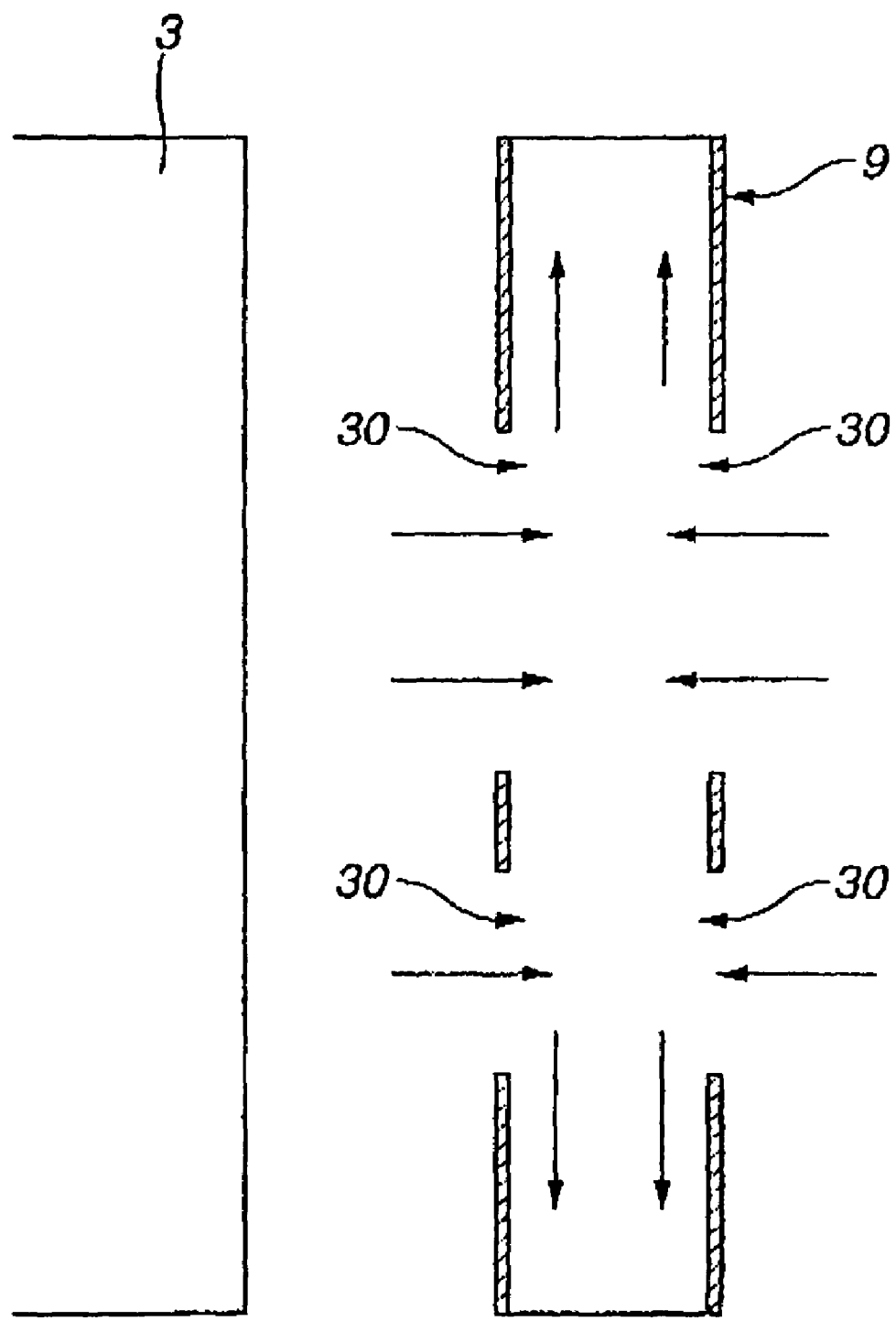
FIG. 21 is an end view of main parts showing wind vent parts of the above windmill device.

FIGS. 20 and 21 show a three blade type vertical windmill device according to a fifth embodiment of the present invention. This embodiment shows the windmill device to which means for more improving the rotating efficiency of the windmills of the windmill devices according to the first to fourth embodiments is applied. In this embodiment, components having the same structures as those of the three blade type vertical windmill devices according to the first embodiment to the fourth embodiment and the previously filed application are designated by the same reference numerals used therein and the detailed explanation thereof is omitted.

A characteristic structure in this embodiment resides in that a vertical shaft 9 disposed in the center of a pair of bottom plates 8 has a cylindrical form and a plurality of wind vent holes 30 are opened therein. It is to be understood that the vertical shaft 9 passes through the lower bottom plate 8 and is connected to power generating means and the vertical shaft 9 transmits the rotating force of blades 3A, 3B and 3C to the power generating means.

Particularly apparent from FIG. 21, on the body part of the cylindrical vertical shaft 9, four wind vent holes 30 are opened on the two stages of upper and lower parts of the body part along the circumference direction. It is to be understood that the number of stages or the number of the wind vent holes 30 along the circumference direction is not limited to this embodiment. Any form that can meet various conditions such as the size of a windmill or an installed place, or the like to realize an optimum rotating efficiency may be employed.

In the three blade type vertical windmill device according to this embodiment constructed as described above, wind introduced to the central part of the bottom plate 8 along the blades 3A, 3B and 3C can be smoothly evaded outside the windmill without forming a vortex flow. Thus, the wind does not remain about the center to act as a reaction for a rotation, so that rotating energy can be very efficiently obtained in the windmill.

In each of the above-described embodiments, the present invention is applied to the windmill device having the above-described structure as an example. However, it is to be understood that the present invention may be applied to various kinds of windmill devices such as a type that wind flows into inside a disk from outside a disk. Further, in each of the embodiments, the structure of the windmill device is employed for a power generation. However, the present invention is not limited thereto and the present invention may be also employed for, for instance, pumping-up.

INDUSTRIAL APPLICABILITY

As described above, according to the invention defined in claim 1, the form the inner peripheral surface of each of the three blades in its cross-section is configured on the basis of the above-described formula. Thus, the flow of wind along each blade can rotate each blade without wastefulness. As a result, the rotating energy can be efficiently obtained irrespectively of the wind direction. The rotating energy can be converted to other energy such as electric energy in a stable way. Since each blade rotates on the vertical shaft as a center, the windmill device is silent so as not to mind its wind cutting sound as compared with the usual propeller type windmill device. Even when the windmill device is installed on a home, an anxiety of generating noise is effectively eliminated.

Further, according to the invention defined in claim 2 in addition to the effects of the invention defined in claim 1, since the fixed guide fins that do not rotate are provided, the outer form of the three blade type vertical windmill device is slightly large. However, since the fins themselves do not rotate, the rotating efficiency can be more greatly improved than a case in which the diameter of the windmill is enlarged. Further, since supports that are essentially required for such a vertical windmill device can be formed by the fixed guide fins, the three blade type vertical windmill device can be formed without increasing the number of parts to prevent the increase of cost.

Further, in the three blade type vertical windmill device defined in claim 3, the width and angle of the fixed guide fins are set in such a manner that when the angle of a wind direction is at right angles to the fins, the outer end parts of the fixed guide fins are larger than the rotating loci of the outer peripheral ends of the blades. Accordingly, the wind can be efficiently introduced to the three blades, so that the rotating efficiency of the windmill can be extremely improved.

Further, in the three blade type windmill device defined in claim 5, since the cross-sectional form of each of the blades is configured in a substantially J-shape including the curved part, the long side part extending from one end of the curved part and the short side part extending from the other end of the curved part. Thus, the air resistance of the blades themselves upon rotation at high speed can be reduced and a high speed rotation can be realized.

Further, in the three blade type vertical windmill device defined in claim 5, the long side part of each of the blades is freely opened and closed on one point of the curved part as a center so that the opening degrees of the short side part and the long side part are adjustable. When the wind power is low, the opening degree is increased and when the wind power is high, the opening degree is decreased. Thus, both upon weak wind and upon strong wind, the windmill device can be efficiently rotated.

Then, according to the invention defined in claim 6, since the wind introduced along the blades can be smoothly evaded outside the windmill without forming a vortex flow irrespectively of the wind direction, the rotating energy can be very efficiently obtained.

Furthermore, according to the invention defined in claim 7, the three blade type windmill device according to any of claims 1 to 3 or claim 5 is combined with the structure defined in claim 6. Thus, various excellent effects can be achieved such as an effect that a more efficient rotating efficiency can be easily obtained.

The invention claimed is:

1. A three blade type vertical windmill device that rotates by a wind power and converts rotating energy to the other energy, said windmill device comprises:
   a bottom plate having a vertical shaft protruding on its center; and
   three plate type blades having their lower ends or upper ends fixed to the bottom plate and curved in their cross-sections,
   wherein the vertical shaft is formed in a tubular shape and a prescribed number of vent through holes are opened on a tubular body.

2. A three blade type vertical windmill device that rotates by a wind power and converts rotating energy to the other energy comprising:
   a bottom plate having a vertical shaft protruding on its center;
   three plate type blades having their lower ends or upper ends fixed to the bottom plate and curved in their cross-sections, wherein the vertical shaft is formed in a tubular shape and a prescribed number vent through holes are opened on a tubular body; and
   energy converting means for converting a rotating energy by the wind power of these blades into other energy, the blades being made of plates with curved cross-sections and being disposed at equal intervals under a state that one side ends are remote from the vertical shaft and the other side ends are near to the vertical shaft, wherein assuming that an outermost radius at a distance between the remotest position of each blade from the center of the vertical shaft and the vertical shaft is r1, an innermost radius as a distance between the nearest position of each blade to the vertical shaft and the vertical shaft is r2, and the angle (rad) of an arbitrary position r in an inner peripheral surface of the cross-section of the blade by regarding a line segment for connecting the remotest position from the vertical shaft to the vertical shaft as a reference is t (wherein, $0 \leq t \leq 2\pi/3$), the form of the inner peripheral surface in the cross-section of the blade satisfies a following formula:

$$r=(r1-r2)\times((t-2\pi/3)\times 2)/(2\pi/3)\times 2+r2.$$

3. A three blade type vertical windmill device that rotates by a wind power and converts rotating energy to the other energy according to claim 2,
   wherein a long side part of the blade is freely opened and closed on a point of the curved part as a center to freely adjust the opening degree of a short side part and the long side part, when a wind power is low, the opening degree is increased, and when the wind power is high, the opening degree is decreased.

4. A three blade type vertical windmill device that rotates by a wind power and converts rotating energy to the other energy comprising:
   a bottom plate having a vertical shaft protruding on its center;
   three plate type blades having their lower ends or upper ends fixed to the bottom plate and curved in their cross-sections, wherein the vertical shaft is formed in a tubular shape and a prescribed number vent through holes are opened on a tubular body; and
   energy converting means for converting a rotating energy by the wind power of these blades into other energy, the blades being made of plates with curved cross-sections and being disposed at equal intervals under a state that one side ends are remote from the vertical shaft and the other side ends are near to the vertical shaft, wherein assuming that an outermost radius at a distance between the remotest position of each blade from the center of the vertical shaft and the vertical shaft is r1, an innermost radius as a distance between the nearest position of each blade to the vertical shaft and the vertical shaft is r2, and the angle (rad) of an arbitrary position r in an inner peripheral surface of the cross-section of the blade by regarding a line segment for connecting the remotest position from the vertical shaft to the vertical shaft as a reference is t (wherein, $0 \leq t \leq 2\pi/3$), the form of the inner peripheral surface in the cross-section of the blade satisfies a following formula:

$r = (r1-r2) \times ((t-2\pi/3) \times 2)/(2\pi/3) \times 2 + r2$, wherein three fixed guide fins are provided upright at equal intervals along the outer periphery of a base for supporting the three blades at equal intervals and each fixed guide fin is inclined at an angle larger than a tangential direction relative to the rotating loci of the outer peripheral ends of the three blades.

5. A three blade type vertical windmill device that rotates by a wind power and converts rotating energy to the other energy according to claim 4, wherein the width and angle of the fixed guide fin are set in such a manner that when the angle of a wind direction is at right angles to the fin, an outer end part of the fixed guide fin is larger than the rotating locus of the outer peripheral end of the blade.

* * * * *